(12) United States Patent
Shabaker (10) Patent No.: US 8,884,086 B2
(45) Date of Patent: Nov. 11, 2014

(54) RENEWABLE DIESEL REFINERY STRATEGY

(75) Inventor: John W. Shabaker, Naperville, IL (US)

(73) Assignee: BP Corporation North America Inc., Houston, TX (US)

(*) Notice: Subject to any disclaimer, the term of this patent is extended or adjusted under 35 U.S.C. 154(b) by 615 days.

(21) Appl. No.: 13/232,473

(22) Filed: Sep. 14, 2011

(65) Prior Publication Data

US 2013/0066120 A1   Mar. 14, 2013

(51) Int. Cl.
| | | |
|---|---|---|
| C07C 1/00 | (2006.01) | |
| C10G 49/22 | (2006.01) | |
| C10G 3/00 | (2006.01) | |
| C10G 45/04 | (2006.01) | |

(52) U.S. Cl.
CPC .......... *C10G 45/04* (2013.01); C10G 2300/207 (2013.01); C10G 2400/04 (2013.01); *C10G 49/22* (2013.01); C10G 2300/202 (2013.01); C10G 2300/1018 (2013.01); C10G 2300/4081 (2013.01); Y02E 50/13 (2013.01); C10G 2300/1011 (2013.01); *C10G 3/46* (2013.01); C10G 2400/08 (2013.01); C10G 2300/1014 (2013.01); *C10G 3/52* (2013.01)
USPC .......... 585/240; 208/120.3; 208/113; 44/605; 44/606

(58) Field of Classification Search
USPC ........... 585/240; 208/108, 120.3; 44/605, 606
See application file for complete search history.

(56) References Cited

U.S. PATENT DOCUMENTS

| | | |
|---|---|---|
| 3,197,399 A | 7/1965 | Wight et al. |
| 3,673,108 A | 6/1972 | Schutt |
| 4,992,605 A | 2/1991 | Craig et al. |
| 5,110,444 A | 5/1992 | Haun et al. |
| 5,362,381 A | 11/1994 | Brown et al. |
| 5,403,470 A | 4/1995 | Kokayeff et al. |
| 5,527,449 A | 6/1996 | Brown et al. |
| 5,705,722 A | 1/1998 | Monnier et al. |
| 6,548,721 B1 | 4/2003 | McCulloch et al. |
| 2004/0055209 A1 | 3/2004 | Jakkula et al. |
| 2004/0230085 A1 | 11/2004 | Jakkula et al. |
| 2007/0006523 A1 | 1/2007 | Myllyoja et al. |
| 2008/0156694 A1* | 7/2008 | Chapus et al. ............. 208/61 |
| 2009/0077868 A1 | 3/2009 | Brady et al. |
| 2010/0038284 A1 | 2/2010 | Vergel |
| 2012/0209041 A1* | 8/2012 | Hanks et al. ............. 585/240 |

FOREIGN PATENT DOCUMENTS

| | | |
|---|---|---|
| AU | 2003258753 | 3/2004 |
| DE | 43 35 399 | 4/1995 |
| DE | 199 49 342 | 4/2001 |
| EP | 1 396 531 | 3/2004 |

(Continued)

OTHER PUBLICATIONS

R.K. Nasirov, et al., Presulfiding of Hydrotreating Catalyst by Elemental Sulfur Outside of the Reactor, Chemistry and Technology of Fuels and Oils, vol. 34, No. 6, 1998, pp. 344-348.

(Continued)

*Primary Examiner* — Nina Bhat
(74) *Attorney, Agent, or Firm* — Kelly L. Cummings (57) ABSTRACT

A process is described that permits the manufacture of renewable diesel while simultaneously manufacturing petroleum based jet fuel and/or diesel fuel. The process provides for the sulfiding of hydroprocessing catalyst used to hydroprocess sulfur deficient biomass derived feedstocks and permits the use of petroleum derived feedstock deactivated hydroprocessing catalyst in biomass derived feedstock service.

10 Claims, 6 Drawing Sheets

(56) References Cited

FOREIGN PATENT DOCUMENTS

| | | |
|---|---|---|
| EP | 1 741 758 | 1/2007 |
| WO | WO 02/31088 | 4/2002 |
| WO | WO 02/092731 | 11/2002 |
| WO | WO 2004/022674 | 3/2004 |
| WO | WO 2010/053468 | 5/2010 |

OTHER PUBLICATIONS

Gaylord Chemical Company, LLC, Dimethyl Sulfide and Dimethyl Sulfoxide as Sulfur Sources in Catalyst Presulfiding, Bulletin # 205B, Oct. 2007, pp. 1-7.

$111^{th}$ Congress, $1^{st}$ Session, A Bill, S, 1589: Biodiesel Tax Incentive Reform and Extension Act of 2009.

Prof. W.R. Jackson, of the School of Chemistry, Monash University, Victoria 3800, Statutory Declaration under the Statutory Declaration Act of 1959, Aug. 2010.

Q & A, Why is Sulfiding of Naphtha Hydrotreater (NHT) Catalyst Necessary After Burning (Regeneration) Before Normalilzation of NHT operation, when the main purpose of the Catalyst Itself is Removal of Sulfur From Sour Naphtha?, file://C:\WINDOWS\Temporary Internet FileOLK46/qandaquestion.htm, Mar. 22, 2011.

* cited by examiner

Figure 1

Prior Art

Normal operation

RENEWABLE DIESEL REFINERY STRATEGY

BACKGROUND OF THE INVENTION

The present invention relates to production of renewable diesel. A requirement of the Renewable Fuels Standard II ("RFS II") is the substantial production of renewable diesel or biodiesel. These legally mandated fuels may only conform to the law if they are not co-produced with petroleum diesel, i.e. produced in stand alone hydrogenation units or produced by batch processing of neat triglycerides. 2009 Federal Senate Bill 1589, 2nd Session of the 111th Congress, introduced into the Senate Aug. 6, 2009 states at Section 40A. "Biodiesel Production (f)(2) that renewable diesel as defined in the bill shall not include any liquid fuel derived from coprocessing biomass with a feedstock which is not biomass. The present invention provides for an integrated process for the catalytic hydroprocessing of a feedstock derived from biomass and a feedstock of petroleum origin in a petroleum refinery using generally pre-existing hydroprocessing units while still complying with RFS II.

BRIEF SUMMARY

The process of the present invention permits the manufacture of renewable diesel in accordance with RFS II at minimal capital cost by permitting the use of generally pre-existing units in a refinery in a novel configuration in accordance with the present invention. Additionally, the invention permits the simultaneous processing of "difficult to process" petroleum origin feedstocks and the production of petroleum-based (i.e. completely non-renewable) jet fuel and/or diesel while running a renewable diesel campaign.

In one embodiment the present invention provides for an integrated process for the catalytic hydroprocessing of a feedstock of petroleum origin containing sulfur and the catalytic hydroprocessing of feedstock derived from biomass which process comprises the steps of:
(a) passing a feedstock of petroleum origin containing sulfur together with a first hydrogen-containing stream to a first hydroprocessing zone and contacting the feedstock of petroleum origin with hydrogen in the presence of a hydroprocessing catalyst at hydroprocessing conditions to produce a first hydroprocessing zone effluent stream;
(b) passing a feedstock derived from biomass together with a second hydrogen-containing stream to a second hydroprocessing zone and contacting the second hydrogen-containing stream with the feedstock of biomass origin in the presence of a hydroprocessing catalyst at hydroprocessing conditions to produce a second hydroprocessing zone effluent stream;
(c) passing the first hydroprocessing zone effluent stream to a separation zone wherein the effluent stream is separated into a hydrogen and hydrogen sulfide-containing vapor stream and a liquid petroleum product stream;
(d) passing at least a portion of the hydrogen and hydrogen sulfide-containing vapor stream separated from the first hydroprocessing zone effluent into the second hydroprocessing zone as at least a portion of the second hydrogen-containing stream; and
(e) passing the second hydroprocessing zone effluent stream to a separation zone wherein the effluent stream is separated into a hydrogen and hydrogen sulfide-containing vapor stream and a liquid biomass derived product stream.

Optionally, a portion of the hydrogen and hydrogen sulfide-containing vapor stream recovered from the separation of the second hydroprocessing zone effluent can be recycled back to the influent to the second hydroprocessing zone as a portion of the second hydrogen-containing stream.

Further objects, features, and advantages of the present invention will become apparent from consideration of the following description and the appended claims when taken in connection with the accompanying drawings.

DETAILED DESCRIPTION OF THE INVENTION

The present invention relates to an improved process for making renewable diesel fuel using generally pre-existing refinery hydroprocessing units while concomitantly permitting the production of petroleum derived diesel and/or jet product with the advantage of being able to treat "difficult to treat" petroleum derived feedstocks.

One of the issues associated with processing feedstock derived from biomass is that these feedstocks generally do not contain sulfur. It is known that hydroprocessing catalysts only achieve their optimum activity, selectivity, and stability when the catalytic metals are present as metal sulfides and not metal oxides. Unfortunately when biomass derived feed stocks are passed to a hydroprocessing zone containing hydroprocessing catalysts such catalysts will soon be deactivated because such feedstocks do not contain sulfur to keep the catalytic metals in their active sulfide form.

In petroleum hydroprocessing processes generally the hydroprocessing catalysts are sulfided by using a gas mixture of hydrogen sulfide and hydrogen, using a feedstock that contains sulfur containing components, using elemental sulfur or treating the hydroprocessing catalyst with organosulfur compounds.

The present invention provides for the sulfiding of a hydroprocessing catalyst that is used to hydroprocess a generally sulfur-free biomass origin or derived feedstock while still complying with RFS II standard which mandates that renewable diesel not be derived from the co-processing of biomass with a feedstock that is not biomass in origin. Additionally, the present invention provides for the simultaneous hydroprocessing of "difficult to process" petroleum origin feedstocks or petroleum-based (i.e. completely non-renewable) jet fuel and/or diesel while permitting the neat processing of biomass origin feedstock.

Figure 1:
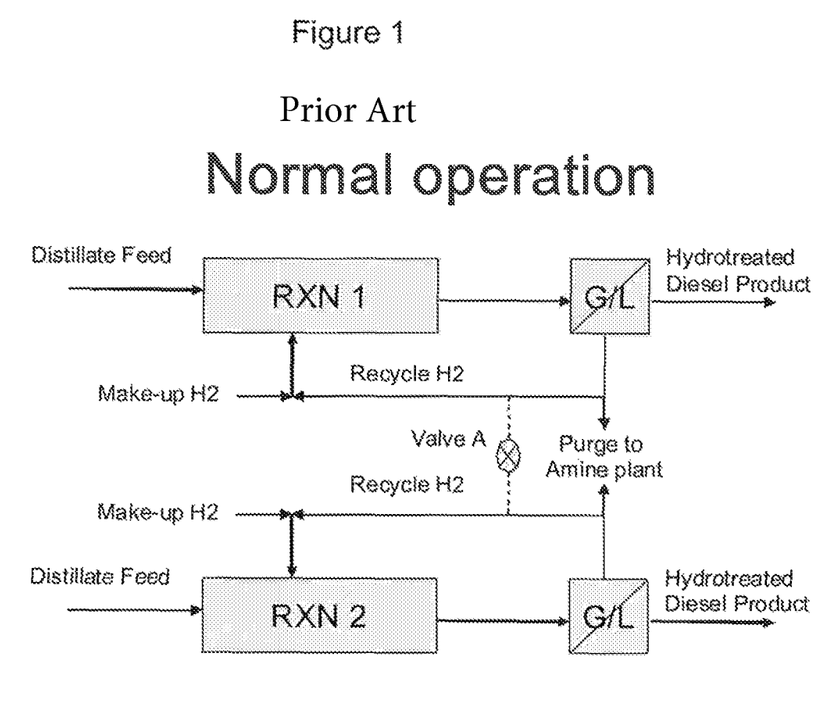
FIG. 1 depicts a schematic view of a prior art hydrogenation process where two hydroprocessing units are operated in parallel.

FIG. 1 schematically depicts typical large refinery configuration that utilizes multiple distillate hydrotreaters in parallel. Both Reactors 1 and 2 each receive a distillate feed that is hydroprocessed under hydroprocessing conditions in the presence of a hydroprocessing catalyst and hydrogen to produce a hydrotreated diesel product. Generally, the effluent from the hydroprocessing zone is passed to a gas liquid separator where hydrogen-containing gases are separated from the liquid product, a portion of which may be recycled back to the hydroprocessing reactor while another portion is passed to an amine plant. The amine plant is typically used to remove acidic components from a gas stream such as $H_2S$ or $CO_2$ by contact with amine solutions containing a basic component such as diethyl- or triethylamine.

Figure 2:
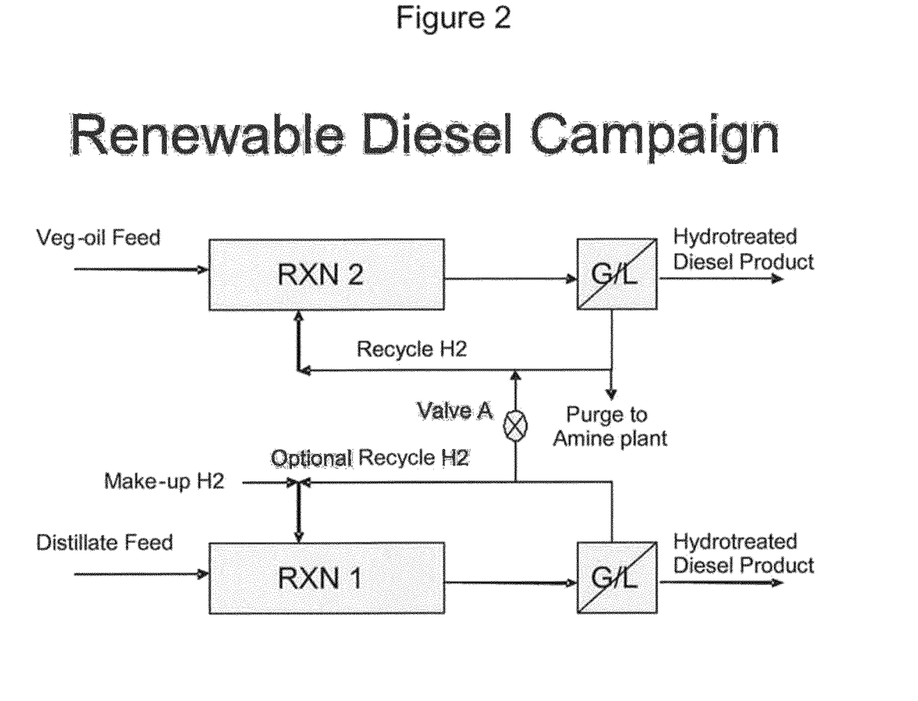
FIG. 2 depicts a schematic view of a process pursuant to the present invention.

As shown in FIG. 2, the invention can be carried out by operating a first hydroprocessing zone that treats petroleum origin feedstock in either a recycle mode or a "once through mode" where advantageously sufficient hydrogen may be passed to the first hydroprocessing zone such that the volume is enough to hydroprocess the petroleum origin feedstock and additionally also treat the biomass origin feedstock in a second hydroprocessing zone. The excess hydrogen volume that is passed to the first hydroprocessing zone permits the first hydroprocessing zone to operate at a higher hydrogen partial pressure which permits better convective cooling thereby permitting longer catalyst life and permitting the first hydroprocessing zone to treat more "difficult to process" or refractory feedstocks such a coker gas oils. The effluent from the first hydroprocessing zone is then passed to a separation zone to produce a hydrogen and hydrogen sulfide-containing stream and a liquid petroleum product stream. At least a portion of this separated hydrogen and hydrogen sulfide containing-stream is then passed to the second hydroprocessing zone where the hydrogen sulfide operates to keep the catalyst metals in the second hydroprocessing zone in the sulfide state. This isolation between the treatment of petroleum derived feedstocks and biomass origin feedstocks permits the greater flexibility in setting operating conditions to convert unusual biomass derived feedstocks. Additionally, by not co-processing biomass derived feestocks with petroleum derived feedstocks the carbon monoxide, carbon dioxide and water that is produced with the hydroprocessing of biomass derived feedstocks will not interfere with the reactions carried out in a separate reactor to hydroprocess petroleum derived feedstocks. The production of gases such as carbon monoxide, methane, carbon dioxide and water generally inhibit the desulfurization activity and other hydrorefining activity of a hydroprocessing catalyst. Further, this configuration isolates the carbon monoxide and carbon dioxide to the amine unit tailgas and avoids interference with other refinery units that may be sensitive to these components. Finally, this configuration allows the products to be isolated permitting the refinery to keep biomass-derived components out of jet fuel.

Optionally, in accordance with the present invention a portion of the effluent from the second hydroprocessing zone or biomass derived feedstock hydroprocessing zone can be recycled back to the influent of this zone. This portion can range from about 10 vol % to about 99 vol % of the total influent stream to the second hydroprocessing zone.

This aspect of the invention provides several advantages in a refinery environment. Specifically, because refinery units are generally designed to handle larger capacities than would be required in treating relatively small typical biomass derived feedstock streams the recycle of liquid effluent permits appropriate feed pumping rates and reactor hydrodynamics. Further, such recycling improves the temperature control of the biomass derived feedstock reactor by virtue of a dilution effect. Reactions taking place in biomass feedstock hydroprocessing reactors are generally very exothermic and the dilution acts as a heat sink via convection. The recycled renewable diesel also helps reduce corrosion and fouling since renewable diesels are generally stable, non-fouling, and non-corrosive. Additionally, when the recycle is implemented a refinery is offered increased selection of the existing units that can be used for biomass feedstock campaigns. Because the biomass feed unit will be running under milder conditions where renewable recycle is used, existing refinery units such as jet fuel hydrotreaters can be used instead of more severe operating units such as ultra low sulfur diesel hydrotreating units. These existing units can be switched over to renewable diesel or jet campaigns at "end of run" conditions for petroleum derived feed processing because while the applicable catalysts may be deactivated the deactivation may not be so severe as to prevent triglyceride conversion.

FIG. 2 schematically depicts a process in accordance with the present invention. Hydroprocessing Reactor 1 is charged with a petroleum derived distillate feed while Hyroprocessing Reactor 2 is charged with a biomass derived vegetable oil feed. Both Reactors 1 and 2 are also charged with hydrogen-containing gas streams. Specifically, the reactor trains are in series to the extent the hydrogen and hydrogen sulfide-containing gases separated from the gas liquid separator downstream of Reactor 1 are passed to the Reactor 2 recycle hydrogen stream through an open Valve A. In this configuration, if a portion of the hydrogen and hydrogen sulfide-containing gases are not recycled back to the influent of Reactor 1, Reactor 1 is run in "once through" mode with a substantial amount of excess hydrogen, generally advantageously an amount that is about equal to or greater than the amount of hydrogen required to hydroprocess the distillate feed to Reactor 1 and the biomass derived feedstock, e.g., vegetable oil feed to Reactor 2. The process depicted in FIG. 2 also shows the recycle of a portion of the hydrogen and hydrogen sulfide-containing gases separated from the Reactor 2 effluent. FIG. 2 shows a portion of the hydrogen and hydrogen sulfide-containing gases separated in the gas liquid separator downstream of Reactor 2 passing to an amine plant. Hydroprocessing Reactor 2 can also be a hydroprocessing reactor that contains catalyst that has been deactivated to end of run conditions in petroleum feed services.

The feedstock of petroleum origin useful in the present invention can generally comprises a substantial portion of a distillate hydrocarbon feedstock, wherein a "substantial portion" is defined as, for purposes of the present invention, at least 50% of the total feedstock by volume. The distillate hydrocarbon feedstock processed in the present invention consists essentially of any one, several, or all refinery streams boiling in a range from about 150° F. (66° C.) to about 1200° F. (649° C.), preferably 300° F. (149° C.) to about 1100° F. (593° C.) at atmospheric pressure. Because the first hydoprocessing zone can be either a hydrocracking zone or a hydotreating zone, additional feedstocks of petroleum origin useful in the present invention include resides, vacuum gas oils, naphtha and liquid petroleum gas.

The distillate hydrocarbon feedstock can comprise high and low sulfur virgin distillates derived from high- and low-sulfur crudes, coker distillates, catalytic cracker light and heavy catalytic cycle oils, and distillate boiling range products from hydrocracker and resid hydrotreater facilities.

The distillate hydrocarbon feedstock sulfur concentration is generally a function of the high and low sulfur crude mix, the hydrodesulfurization capacity of a refinery per barrel of crude capacity, and the alternative dispositions of distillate hydrodesulfurization feedstock components. The higher sulfur distillate feedstock components are generally virgin distillates derived from high sulfur crude, coker distillates, and catalytic cycle oils from fluid catalytic cracking units processing relatively higher sulfur feedstocks. These distillate feedstock components can range as high as 3% by weight elemental sulfur but generally range from about 0.1% by weight to about 1% by weight elemental sulfur.

When "difficult to process" distillate feedstocks are passed the first hydroprocessing zone in accordance with the present invention these feedstocks may have high heteroatom, olefin or aromatics content. Further, the type of sulfur or nitrogen species in the feed may be particularly refractory toward hydroprocessing conditions. The types of olefinic and aromatic species may be prone to coking or fouling under hydroprocessing conditions. These feedstock streams often come from refinery conversion processes such as cokers, catalytic crackers or hydrocrackers.

The biomass derived feedstock used in the present invention can be derived from plant oils, animal fats, algae or microorganisms. The diesel fuel manufactured from, biomass derived feedstocks is commonly referred to as "renewable diesel". Renewable diesel is considered to be a fuel which has similar properties to petroleum derived diesel, but which is made from biologically occurring fats and oils from plant and animal matter as distinct from the mineral crude oils from which petroleum diesel is manufactured.

The molecules which make up renewable diesel (and petroleum diesel) generally contain a long hydrocarbon chain (e.g. alkanes, esters, alcohols). As renewable diesel is produced with similar properties to petroleum diesel, it can be used as a straight substitute for petroleum diesel in diesel engines. Alternatively, it can be blended with petroleum diesel if desired.

Biomass materials generally include plant oils and animal fats. Animal fats can include materials such as beef tallow, fish fat and chicken fat. Plant oils include palm oil, soy bean oil, rapeseed oil, sunflower oil, linseed oil, rice bran oil, corn oil, caster oil, babassu oil, jatropha, tall oil and oil derived from algae or microorganisms. Both plant oils and animal fats consist of molecules having the same chemical structure involving triesters of glycerol with a range of fatty acids varying in chain length and degree of unsaturation. Plant oils and animal fats will also contain some fatty acids which are not bound to a glycerol group. Generally, animal fats are referred to as fats because they have a higher melting point and are solid at room temperature because they tend to contain a greater percentage of saturated fatty acids and/or a lower percentage of short chain fatty acids. Generally, plant oils are referred to as oils because they have a lower melting point and are fluid at room temperature because they tend to contain a lesser percentage of saturated fatty acids and/or a higher percentage of short chain fatty acids.

In accordance with the present invention the feedstock derived from biomass can be a mixture of animal fats and plant oils at the start of any process of making renewable diesel, such that the animal fat and plant oil are co-processed.

Plant oils and animal fats consist largely of glyceryl esters of straight chain fatty acids, which can be broken down into straight chain molecules which are desired for diesel engine fuel.

The hydrocarbon chain groups in animal fats and plant oils consist of different numbers of hydrocarbon atoms, mainly between 12 and 18. Triglycerides from different biological sources have different distributions of fatty acid lengths and are generally straight chained. These distributions are generally known to those in the industry. The distribution of hydrocarbon chain lengths and chain branching varies between biological sources, but there is no particular distinction between the distribution of hydrocarbon chain length and chain branching in animal fats and the distribution of hydrocarbon chain length and chain branching in plant oils. Some animal fats have very similar distributions to plant oils. Animal fats tend to have fewer double bonds than plant oils, giving them a higher melting point and making them "fats" rather than "oils".

Physically, saturated triglycerides tend to be solid at room temperature, whereas unsaturated triglycerides tend to be liquid at room temperature, which can make saturated fats slightly more difficult to handle. Issues involving fats which are solid at ambient temperatures are generally overcome by the use of heated lines and heated tankers for transport of such fats and oils. Such apparatuses for handling products with similar solidification temperatures are also very well known and commonly used across many chemical industries.

In accordance with the present invention the biomass derived feedstock comprising animal fats and/or plant oils is reacted with hydrogen gas in the presence of a hydroprocessing catalyst as described below.

The hydrogenation of fatty acids, fatty acid esters, and glycerides (including triglycerides) in the presence of hydroprocessing catalysts promotes reduction to hydrocarbons. The reduction to hydrocarbons involves removing the oxygen content by reaction with hydrogen or cleaving the hydrocarbon chains from the fatty acids.

Hydrogenation of the animal fats and plant oils also removes the olefins resulting in a renewable diesel that is more stable and has a longer shelf life and produces paraffinic hydrocarbons which have a greater cetane number. Thus the renewable diesel produced by this process can be considered a better fuel than for instance fatty acid methyl ester "FAME" or biodiesel.

The hydrogen stream used in the first hydroprocessing zone can be pure hydrogen or can be in admixture with diluents such as low-boiling hydrocarbons, carbon monoxide, carbon dioxide, nitrogen, water, sulfur compounds, and the like. The hydrogen stream purity should be at least about 50% by volume hydrogen, preferably at least about 65% by volume hydrogen, and more preferably at least about 75% by volume hydrogen for best results. Hydrogen can be supplied from a hydrogen plant, a catalytic reforming facility, or other hydrogen-producing or hydrogen-recovery processes.

The first hydroprocessing zone can be operated as a hydrocracking zone or a hydrotreating zone. The amount of hydrogen passed to the first hydroprocessing stream can advantageously be equal to or greater than the amount of hydrogen required to hydroprocess both the petroleum derived feedstock stream and the biomass derived stream when the petroleum derived feedstock hydroprocessing unit is operated in a once through mode.

In the present invention the reaction zones can consist of one or more fixed bed reactors containing the same or different catalysts. A fixed bed reactor can also comprise a plurality of catalyst beds. The plurality of catalyst beds in a single fixed bed reactor can also comprise the same or different catalysts.

Both the first and the second hydroprocessing zones of the present invention generally will include a feedstock preheating step. The feedstock can be preheated in feed/effluent heat exchangers prior to entering a furnace for final preheating to a targeted reaction zone inlet temperature. The feedstock can be contacted with a hydrogen containing stream prior to, during, and/or after preheating.

Since the hydroprocessing reactions are generally exothermic, interstage cooling, consisting of heat transfer devices between catalyst beds in the same reactor shell, can be employed. At least a portion of the heat generated from the hydroprocessing process can often be profitably recovered for use in the hydroprocessing process. Suitable heat sinks for absorbing such heat provided by the hydroprocessing reaction exotherm can generally include the feedstock preheat section of the hydroprocessing process upstream of the reactor preheat furnace described hereinabove. Where this heat recovery option is not available, cooling of the reaction zone effluent may be performed through cooling utilities such as cooling water or air, or through use of a hydrogen quench stream injected directly into the reactors.

In each hydroprocessing zone of the present invention the reaction zone effluent is generally cooled and the effluent stream is directed to a separator device to separate the hydrogen-containing gases from the reaction zone effluent. In the case of the petroleum derived feedstock first hydroprocessing zone, at least a portion of or the entire stream of separated gaseous phase containing hydrogen and hydrogen sulfide is then passed to the second or biomass derived feedstock hydroprocessing zone influent. Depending upon the pressure used in the first hydroprocessing zone the pressure of the separated gaseous phase may have to be increased inasmuch as the second hydroprocessing stream is generally operated at 30 barg or above.

In the second hydroprocessing zone some of the recovered hydrogen-containing stream from the separator device can be recycled back to the second hydroprocessing zone while some of the hydrogen containing stream can be purged to external systems such as an amine plant or refinery fuel system. The hydrogen purge rate is often controlled to maintain a minimum hydrogen purity and to remove hydrogen sulfide, carbon oxides, or low boiling hydrocarbons. Recycled hydrogen is generally compressed and reinjected into the second hydroprocessing zone. Hydrogen is preferably passed through the reaction zone or zones in a multi-stage process, in a co-current fashion. Additionally, a portion of the liquid effluent from the renewable diesel stream can be recycled to the influent of the second reaction zone to provide the benefits mentioned above.

The separator device liquid effluent can then be processed in a stripper device where light hydrocarbons can be removed and directed to more appropriate hydrocarbon pools. The stripper liquid effluent product is then generally conveyed to blending facilities for production of finished distillate or other products.

In another embodiment of the process of the present invention the hydroprocessing process in either zone can be carried out in two or more-stages.

Other operating conditions used in the hydroprocessing process zones of the present invention include an average reaction zone temperature of from about 400° F. (204° C.) to about 750° F. (399° C.), preferably from about 500° F. (260° C.) to about 750° F. (399° C.), and most preferably from about 550° F. (288° C.) to about 750° F. (399° C.) for best results. Reaction temperatures below these ranges can result in less effective hydrodesulfurization and hydroprocessing. Excessively high temperatures can cause the process to reach a thermodynamic aromatic reduction limit, excessive hydrocracking, catalyst deactivation, product instability, and increase energy costs.

The process of the present invention generally operates at reaction zone pressures ranging from about 300 psig (20.7 barg) to about 2,000 psig (138 barg), more preferably from about 500 psig (345 barg) to about 1,500 psig (103 barg), and most preferably from about 600 psig (41.4 barg) to about 1,200 psig (82.8 barg) for best results. Excessively high reaction pressures increase energy and equipment costs and provide diminishing marginal benefits. The second reaction zone is generally operated at 300 psig (20.7 barg) or above.

Each reaction zone in the process of the present invention generally operates at a liquid hourly space velocity (LHSV) of from about 0.2 hr.$^{-1}$ to about 10.0 hr.$^{-1}$, preferably from about 0.5 hr.$^{-1}$ to about 4.0 hr.$^{-1}$ for best results. Excessively high space velocities will result in incomplete conversion of the feedstocks and/or high product heteroatom, olefin, or aromatic content of the products.

The hydrogen addition rates to the first hydroprocessing zone can range from 100 standard cubic feet per barrel (17.8 normal liters per liter) to 10000 standard cubic feet per barrel (1780 normal liters per liter) bearing in mind that the rate may be set to accomplish the hydroprocessing in the first hydroprocessing zone and the second hydroprocessing zone.

The hydrogenation component of a typical hydrodesulfurization catalyst comprises a Group VIB metal and a Group VIII metal of the Periodic Table of Elements. The Group VIB metals suitable for use in the present invention include chromium, molybdenum and tungsten. The preferred Group VIB metals are molybdenum and tungsten, and preferably molybdenum. The Group VIII metals suitable for use in the present invention include iron, cobalt, nickel, ruthenium, rhodium, palladium, osmium, iridium, and platinum. The preferred Group VIII metals are cobalt and nickel, preferably nickel. These metals can be present in the catalyst in their elemental form or as their oxides, sulfides, or mixtures thereof. Generally these metals are supported on a support comprising alumina, silica alumina, and acidic zeolites such as ZSM-22, ZSM-23 or the like.

Hydrogenation component metals can be deposed or incorporated upon the support by impregnation employing heat-decomposable salts of the Group VIB and VIII metals or other methods known to those skilled in the art such as ion-exchange, with impregnation methods being preferred.

The foregoing description is given for clearness of understanding only, and no unnecessary limitations should be understood therefrom, as modifications within the scope of the disclosure may be apparent to those having ordinary skill in the art.

The present invention is described in further detail in connection with the following examples, it being understood that the examples are for purposes of illustration and not limitation.

Example 1

In accordance with the present invention renewable diesel was produced from neat soybean oil for approximately 10 days under typical hydrotreating conditions using a commercial available NiMo catalyst in a benchscale hydroprocessing unit. The conditions in the hydrotreating zone included 350° C., 56 bang, 1 LHSV, 2100 nL H$_2$/L oil). The sulfur-free feed oil was spiked with 855 wppm sulfur as dimethyldisulfide (DMDS), which immediately converted to H$_2$S under reaction conditions to avoid stripping sulfur from the catalyst. Yields include 84.7 wt % oil paraffin oil with significant CO$_2$ (4.3 wt %), light hydrocarbon (5.1 wt %) and water (9.2 wt %) make. During this run top of the bed exotherms increased by approximately 60° F. (33° C.). This run shows that when sulfur was added to the influent to the biomass derived hydroprocessing zone in accordance with the present invention no deactivation of the catalyst occurred.

Figure 3A:
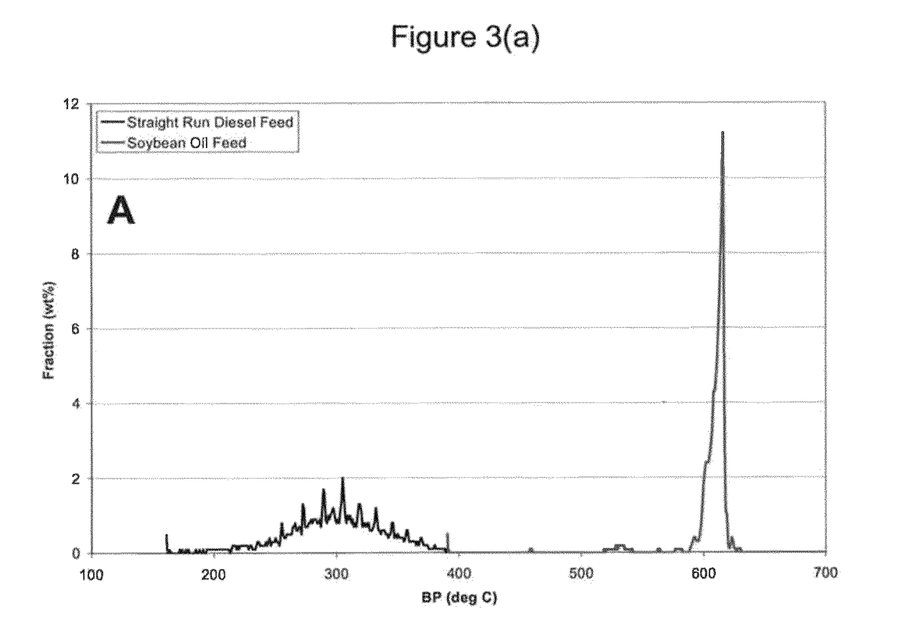
FIG. 3(a) show SimDis chromatograms for a soybean oil and typical petroleum diesel.
Figure 3B:
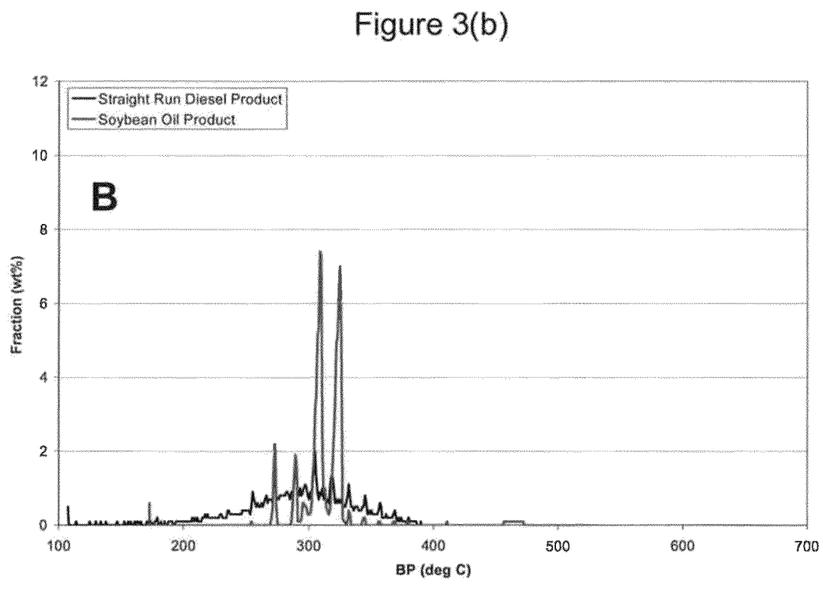
FIG. 3(b) shows SimDis chromatograms of a soybean oil product that has been hydrotreating in accordance with the present invention.

SimDis chromatograms provided in FIG. 3(a) show soybean oil and typical petroleum diesel. Soybean oil is composed of triglyceride oils have an apparent boiling point at about 600° C. (1112° F.) and minor impurities such as monoglycerides, diglycerides, sterols, phosphatides, etc. that boil between the endpoint of diesel and about 600° C. SimDis chromatograms provided in FIG. 3(b) show that after hydrotreating in accordance with the present invention in this example, these components were nearly completely converted to renewable diesel, a blend of only several distinct n-paraffins, primarily $nC_{15}$-$C_{18}$.

Example 2

Two renewable diesel experiments were run in a bench scale pilot plant to demonstrate successful processing of renewable diesel under high and low pressure hydroprocessing conditions.

This example serves to show the benefits of recycling a portion of the effluent in the second or biomass derived feedstock hydroprocessing zone in accordance with the present invention.

During the two runs, neat soybean oil was run for up to 7 days under typical hydroprocessing conditions (350° C., 56 barg, LHSV=1, $H_2$/Oil=5 times hydrogen consumption (which translates to 2100 nL $H_2$/L for neat soy oil), while 1000 ppm S as DMDS was added to the sulfur-free feeds. Two different catalyst loads (commercial CoMo— and NiMo/$Al_2O_3$) containing whole extrudates diluted 1:1 vol with 180 mesh SiC were employed in runs 1 and 2, respectively. Each catalyst performed substantially the same. As can be expected from the results in Example 1, significant exotherms were measured near the top of the catalyst beds. Complete conversion of the soybean oil to renewable diesel was observed in both cases.

Figure 4:
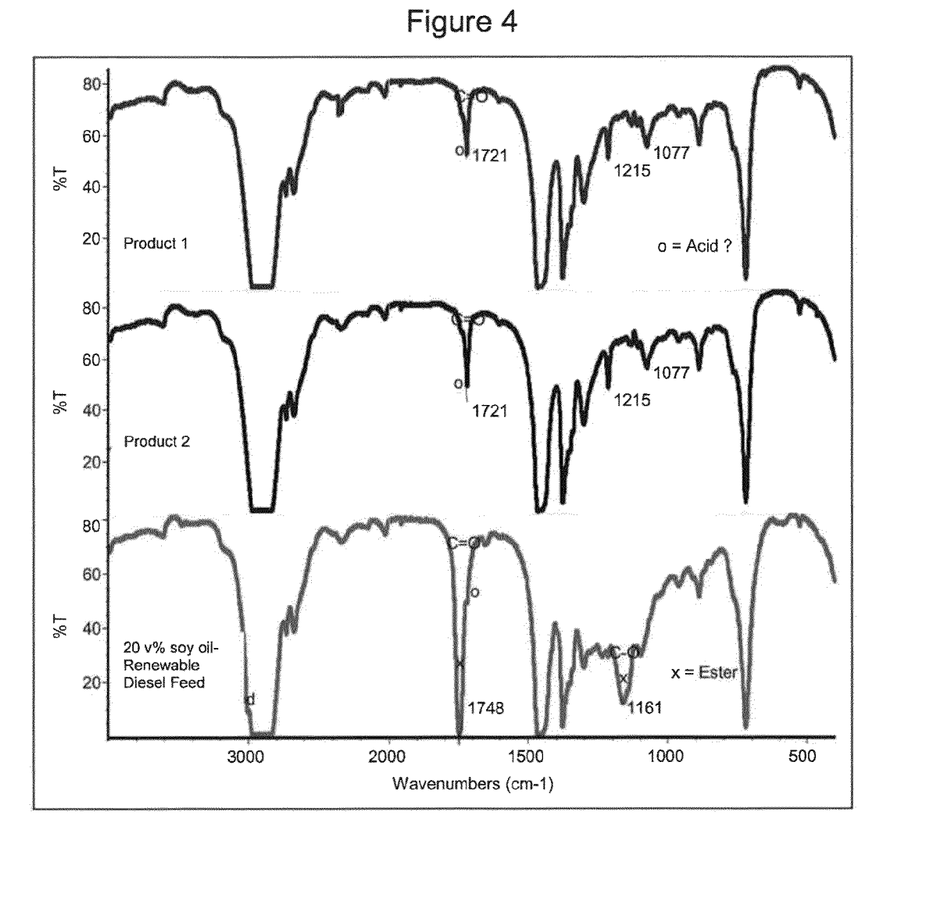
FIG. 4 shows the results of Fourier transform infrared (FTIR) spectroscopic analysis of products from runs carried out in accordance with the invention.

Low-severity including lower pressure processing was then demonstrated at the end of each of these two runs using liquid product recycle in accordance with the present invention. A feed mixture containing 20 vol % fresh soybean oil and 80 vol % renewable diesel that was collected from earlier effluent in runs 1 and 2 and spiked with DMDS as in the first two runs. This feed mixture was successfully processed for about 1 week at 350° C., 27.6 barg, LHSV=1, and $H_2$/Oil=400 nL/L, making a clear liquid product with cloudpoint near 20° C. The products were analyzed via FTIR to verify destruction of the triglyceride ester groups at about 1748 $cm^{-1}$ during low severity processing method of this 20 vol % fresh soybean oil in renewable diesel feed. The spectra in FIG. 4 (which plots percent transmission against wave numbers) show some residual free fatty acids (1721 $cm^{-1}$) in the products where Product 1 is the product obtained from the CoMo catalyst run and Product 2 is the product obtained from the NiMo/$Al_2O_3$ catalyst run implying only ~80% conversion of the soybean oil in the feed. The experiment ended with three successful days processing neat soybean oil under the same conditions as employed for the runs having the feed containing 80 vol % renewable diesel, although the product was noticeably yellow in color, likely due to unconverted olefins in the product associated with relatively high reaction temperature and low pressure. This example shows that when recycle of a portion of the liquid effluent is carried out in accordance with the present invention less severe conditions can be employed in the biomass derived feedstock hydroprocessing zone which enable the use of less capable hydroprocessing units and enhance equipment and catalyst longevity by avoiding hot spots and metallurgical limits. For example, a reduced exotherm was observed for the low severity processing of 20 vol % soybean oil in renewable diesel feed relative to Example 1.

Figure 5:
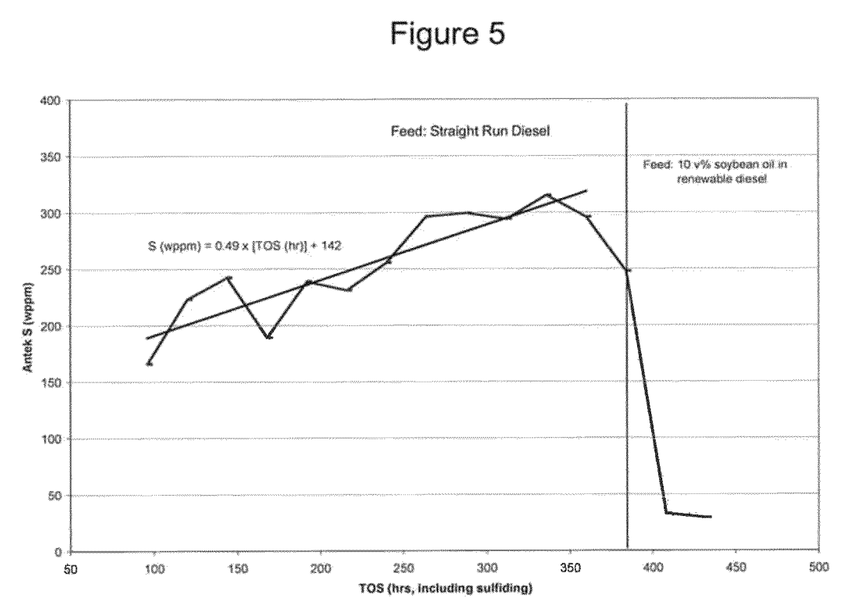
FIG. 5 shows a plot of sulfur in the product versus run time for a run where the biomass derived hydroprocessing reaction zone contained a catalyst that had been previously deactivated by running a petroleum derived feedstock over the catalyst.

In a third Run, the bench scale pilot plant reactor was loaded with fresh commercial CoMo/$Al_2O_3$ catalyst using 1:1 volume of 180 mesh SiC diluent. The catalyst was sulfided using straight run diesel containing 3 wt % DMDS. The catalyst was then subjected to "severe" conditions for 10 days using straight run diesel feed (650° F., 360 psig, LHSV=1.5, and $H_2$/Oil=700 scf/bbl) to partially deactivate the catalyst and simulate end of run conditions in a reactor used for petroleum derived feedstock processing. FIG. 5 shows the increase in residual sulfur found in the reactor effluent as a function of run time under these conditions as the catalyst deactivated. The feed was then switched to 10 vol % fresh soybean oil and 90 vol % in renewable diesel product from previous runs (spiked with DMDS to 400 wppm S), and the test ran successfully with only 100 nL/L $H_2$ input for 7 days. The product was clear liquid with no residual oxygen content and a cloudpoint near 20° C. Since there was no oxygen in the product all trygicerides and fatty acids were removed to make a more desirable product. Fatty acids are corrosive and tryglicerides have high cloud points which may result in fuel freezing. This example shows that the integrated process of the present invention can be judiciously used with second reaction zone that was previously at end of run conditions with a deactivated catalyst used in petroleum processing to carry out a renewable diesel or jet fuel campaign. This is possible because of the mild conditions permitted in this second reaction zone by virtue of the effluent recycle in accordance with the present invention.

What is claimed is:

1. An integrated process for the catalytic hydroprocessing of a feedstock of petroleum origin containing sulfur and the catalytic hydroprocessing of feedstock derived from biomass which process comprises the steps of:
    (a) passing said feedstock of petroleum origin containing sulfur together with a first hydrogen-containing stream to a first hydroprocessing zone and contacting said feedstock of petroleum origin with hydrogen in the presence of a hydroprocessing catalyst at hydroprocessing conditions to produce a first hydroprocessing zone effluent stream;
    (b) passing said feedstock derived from biomass together with a second hydrogen-containing stream to a second hydroprocessing zone and contacting said second hydrogen-containing stream with said feedstock of biomass origin in the presence of a hydroprocessing catalyst at hydroprocessing conditions to produce a second hydroprocessing zone effluent stream;
    (c) passing said first hydroprocessing zone effluent stream to a separation zone wherein the said effluent stream is separated into a hydrogen and hydrogen sulfide-containing vapor stream and a liquid petroleum product stream;
    (d) passing at least a portion of said hydrogen and hydrogen sulfide-containing vapor stream separated from said first hydroprocessing zone effluent stream into said second hydroprocessing zone as at least a portion of said second hydrogen containing stream; and
    (e) passing said second hydroprocessing zone effluent stream to a separation zone wherein said effluent stream is separated into a hydrogen- and hydrogen sulfide containing vapor stream and a liquid biomass derived product stream.

2. The process of claim 1 wherein the feedstock passed to the first hydroprocessing zone is a "difficult to process" feedstock.

3. The process of claim 1 wherein the product from the first hydroprocessing zone is jet fuel.

4. The process of claim 1 wherein the first hydrogen containing stream contains at least sufficient hydrogen to hydroprocess both the petroleum origin feedstock in the first hydroprocessing zone and the feedstock derived from biomass in the second hydroprocessing zone.

5. The process of claim 1 where substantially all of the hydrogen and hydrogen sulfide-containing vapor stream in step (d) separated from the first hydroprocessing zone effluent is passed to the second hydrogen containing stream.

6. The process of claim 1 wherein a portion of the liquid biomass derived product stream is recycled back to the feedstock derived from biomass influent to the second hydroprocessing zone.

7. The process of claim 6 wherein the portion of the liquid biomass derived product stream is present in the influent to the second hydroprocessing zone in a ratio ranging from about 10 vol % to about 99 vol % of the total influent stream to the second hydroprocessing zone.

8. The process of claim 1 wherein the hydroprocessing catalyst in the second hydroprocessing zone is partially deactivated from prior petroleum derived feedstock service.

9. The process of claim 6 where the process conditions in the second hydroprocessing zone include a lower temperature than the process conditions in the first hydroprocessing zone.

10. The process of claim 1, further comprising passing at least a portion of the hydrogen-and hydrogen sulfide-containing stream separated from said second hydroprocessing zone into said second hydroprocessing zone as at least a portion of said second hydrogen-containing stream.

* * * * *